(12) United States Patent
Goto

(10) Patent No.: US 8,006,848 B2
(45) Date of Patent: Aug. 30, 2011

(54) FILTER AND MANUFACTURING METHOD THEREFOR

(75) Inventor: Tatsuya Goto, Kariya (JP)

(73) Assignee: Toyota Boshoku Kabushiki Kaisha, Kariya-shi (JP)

( * ) Notice: Subject to any disclaimer, the term of this patent is extended or adjusted under 35 U.S.C. 154(b) by 1013 days.

(21) Appl. No.: 11/833,508

(22) Filed: Aug. 3, 2007

(65) Prior Publication Data

US 2008/0060987 A1    Mar. 13, 2008

(30) Foreign Application Priority Data

Sep. 12, 2006    (JP) ................................ 2006-247302

(51) Int. Cl.
*B01D 35/30* (2006.01)

(52) U.S. Cl. ............. 210/435; 55/490; 55/492; 210/445; 210/451; 210/483

(58) Field of Classification Search .................. 210/232, 210/445, 451, 483; 55/490, 491, 492, 495, 55/497, 501; 156/73.5, 73.6; 29/896.62
See application file for complete search history.

(56) References Cited

U.S. PATENT DOCUMENTS

| | | | | |
|---|---|---|---|---|
| 3,782,083 A | * | 1/1974 | Rosenberg | 55/491 |
| 6,131,573 A | * | 10/2000 | Brown | 128/205.27 |
| 6,427,846 B1 | * | 8/2002 | Graus et al. | 210/445 |
| 6,432,307 B2 | * | 8/2002 | Gizowski et al. | 210/321.6 |
| 6,568,540 B1 | * | 5/2003 | Holzmann et al. | 210/445 |
| 6,890,366 B2 | * | 5/2005 | Bugli et al. | 55/385.3 |
| 2002/0121473 A1 | * | 9/2002 | Boast et al. | 210/450 |
| 2004/0256046 A1 | | 12/2004 | Sakakibara | |
| 2006/0191840 A1 | * | 8/2006 | Homi | 210/435 |
| 2006/0219624 A1 | | 10/2006 | Kuno | |
| 2007/0220844 A1 | * | 9/2007 | Yamazaki et al. | 55/341.6 |

FOREIGN PATENT DOCUMENTS

| | | | |
|---|---|---|---|
| DE | 10 2004 045 421 A1 | | 3/2006 |
| DE | 10 2005 059 546 A1 | | 8/2006 |
| EP | 0526678 A1 | * | 10/1993 |
| EP | 1 438 998 A2 | | 7/2004 |
| JP | 5-29735 | | 4/1993 |
| JP | 2001-105500 | * | 4/2001 |
| JP | 2007-136334 | | 6/2007 |
| WO | WO 99/06135 | | 2/1999 |

OTHER PUBLICATIONS

Derwent abstract for JP2001-105500 (Apr. 2001), from East, downloaded on Jan. 16, 2011.*

* cited by examiner

*Primary Examiner* — Joseph W Drodge
(74) *Attorney, Agent, or Firm* — Oblon, Spivak, McClelland, Maier & Neustadt, L.L.P.

(57) ABSTRACT

A filter includes a first case member and a second case member that are made of synthetic resin and are mutually joined to form a filter chamber, and a filter element including a filtering medium and a holding frame that is made of synthetic resin, which holds a peripheral portion of the filtering medium and is held between joining ends of the case members. Weld portions formed by laser light are provided at a contact area extending in a joining direction between the holding frame of the filter element and at least one joining end of the joining ends of the case members.

12 Claims, 5 Drawing Sheets

FILTER AND MANUFACTURING METHOD THEREFOR

BACKGROUND OF THE INVENTION

1. Field of the Invention

The present invention relates to a filter and a manufacturing method therefor. More specifically, the present invention relates to a filter for which a compact structure can be achieved by suppressing occurrence of welding burrs and keeping a weld portion and a burr gutter to the minimum required, and a manufacturing method therefor.

2. Description of the Related Art

A filter is known in which a pair of case members made of synthetic resin are welded together by vibration welding, and a filter element is held between the pair of case members (see JP-UM-A-H05-29735 for example).

JP-UM-A-H05-29735 discloses that, as shown in FIG. 12, for example, a joining portion 102a is formed at a lower end rim of an upper case 102, and joining portions 103a and 104a facing the joining portion 102a of the upper case 102 are formed respectively at an upper end rim of a lower case 103 and an outer rim of a screen frame 104.

According to JP-UM-A-H05-29735, nevertheless, the joining portion 102a of the upper case 102 is vibration-welded to both the joining portion 103a of the lower case 103 and the joining portion 104a of the screen frame 104 at the same time. Accordingly, this requires a sufficient flat area to be secured on a contact area of the joining portion 102a of the upper case 102, and a space (burr gutter) r for welding burrs that occur in a relatively large amount during vibration welding to be provided at both sides of the joining portion 102a of the upper case 102. Furthermore, the space r and a weld portion w are normally disposed along the entire periphery of the filter, thus enlarging the size of the filter.

SUMMARY OF THE INVENTION

Problems to be Solved by the Invention

In light of the circumstances described above, it is an object of the present invention to provide a filter for which a compact structure can be achieved by suppressing occurrence of welding burrs and keeping a weld portion and a burr gutter to the minimum required, and a manufacturing method therefor.

Means for Solving Problem

The present invention is described as follows.

1. A filter comprising:

a first case member and a second case member that are made of a synthetic resin and are mutually joined to form a filter chamber; and a filter element including a filtering medium and a holding frame that is made of a synthetic resin, holds a peripheral portion of the filtering medium and is held between a joining end of the first case member and a joining end of the second case member, characterized in that a weld portion formed by laser light is provided at a contact area extending in a joining direction between the holding frame of the filter element and at least one joining end of the joining end of first case member and the joining end of second case member.

2. The filter according to 1 above, wherein one of the joining end of the one case member and the holding frame of the filter element is provided with a convex portion that protrudes in the joining direction, while the other is provided with a concave portion that engages with the convex portion, and the weld portion is provided at an outer side surface of an engagement portion between the convex portion and the concave portion.

3. The filter according to 2 above, wherein, on at least one of an inner periphery side and an outer periphery side of the convex portion and the concave portion, one of the joining end of the one case member and the holding frame of the filter element is provided with an engaging portion that protrudes in the joining direction, while the other is provided with an engaged portion that engages with the engaging portion.

4. The filter according to 2 above, wherein a tapered face is provided on an inner side surface of the engagement portion between the convex portion and the concave portion.

5. The filter according to 4 above, wherein, on at least one of an inner periphery side and an outer periphery side of the convex portion and the concave portion, one of the joining end of the one case member and the holding frame of the filter element is provided with an engaging portion that protrudes in the joining direction, while the other is provided with an engaged portion that engages with the engaging portion.

6. The filter according to 1 above, wherein a first weld portion formed by laser light is provided at a contact area extending in the joining direction between the joining end of the first case member and the holding frame of the filter element, and wherein a second weld portion formed by laser light is provided at a contact area extending in the joining direction between the joining end of the second case member and the holding frame of the filter element.

7. The filter according to 6 above, wherein the first case member and the second case member are made of a synthetic resin material having laser permeability, and the holding frame of the filter element is made of a synthetic resin material having laser absorbency, and the first weld portion and the second weld portion are formed by laser light radiated in a direction from exposed outer side surfaces of the first case member and the second case member toward the contact area.

8. The filter according to 6 above, wherein the first case member and the second case member are made of a synthetic resin material having laser absorbency, and the holding frame of the filter element is made of a synthetic resin material having laser permeability, and the first weld portion and the second weld portion are formed by laser light radiated in a direction from exposed outer side surfaces of the holding frame of the filter element toward the contact area.

9. The filter according to 6 above, wherein the holding frame of the filter element comprises an upper holding frame made of a synthetic resin material having laser absorbency and a lower holding frame made of a synthetic resin material having laser permeability, and the first case member is made of a synthetic resin material having laser permeability, and the second case member is made of a synthetic resin material having laser absorbency, and the first weld portion and the second weld portion are formed by laser light radiated in a direction from exposed outer side surfaces of the first case member the lower holding frame of the filter element toward the contact area.

10. The filter according to 1 above, wherein the first case member is made of a synthetic resin material having laser permeability, and the second case member and the holding frame of the filter element are made of a synthetic resin material having laser absorbency, and an outer wall that extends in the joining direction and a tip of which contacts the outer side surface of a base of a joining end of the second case member is provided at the outer side of the convex portion of the first case member, and wherein a first weld portion formed by laser light is provided at a contact area extending in the joining direction between the tip of the outer wall of the first case member and the base of the joining end of the second case member, and wherein a second weld portion formed by laser light is provided at a contact area extending in the joining direction between the joining end of the second case member and the holding frame of the filter element.

11. A manufacturing method for the filter according to 1 above, characterized in comprising the steps of:

holding the holding frame of the filter element between the joining end of the first case member and the joining end of the second case member; and forming the weld portion by radiating laser light toward a contact area extending in the joining direction between the holding frame of the filter element and at least one joining end of the joining end of the first case member and the joining end of the second case member.

12. The manufacturing method for the filter according to 11 above, wherein one of the joining end of the one case member and the holding frame of the filter element is provided with a convex portion that protrudes in the joining direction, while the other is provided with a concave portion that engages with the convex portion, and the radiating laser light is a radiating laser light in a direction toward an outer side surface of an engagement portion between the convex portion and the concave portion.

13. The manufacturing method for the filter according to 12 above, wherein, on at least one of an inner periphery side and an outer periphery side of the convex portion and the concave portion, one of the joining end of the one case member and the holding frame of the filter element is provided with an engaging portion that protrudes in the joining direction, while the other is provided with an engaged portion that engages with the engaging portion.

14. The manufacturing method for the filter according to 12 above, wherein a tapered face is provided on an inner side surface of the engagement portion between the convex portion and the concave portion.

15. The manufacturing method for the filter according to 14 above, wherein, on at least one of an inner periphery side and an outer periphery side of the convex portion and the concave portion, one of the joining end of the one case member and the holding frame of the filter element is provided with an engaging portion that protrudes in the joining direction, while the other is provided with an engaged portion that engages with the engaging portion.

16. The manufacturing method for the filter according to claim 11, wherein forming the weld portion involves forming a first weld portion by radiating laser light at a contact area extending in the joining direction between the joining end of the first case member and the holding frame of the filter element, and forming a second weld portion by radiating laser light at a contact area extending in the joining direction between the joining end of the second case member and the holding frame of the filter element.

17. The manufacturing method for the filter according to claim 16, wherein the first case member and the second case member are made of a synthetic resin material having laser permeability, and the holding frame of the filter element is made of a synthetic resin material having laser absorbency, and wherein forming the first weld portion and the second weld portion involves forming the first weld portion and the second weld portion by radiating laser light in the direction from exposed outer side surfaces of the first case member and the second case member toward the contact area.

18. The manufacturing method for the filter according to claim 16, wherein the first case member and the second case member are made of a synthetic resin material having laser absorbency, and the holding frame of the filter element is made of a synthetic resin material having laser permeability, and wherein forming the first weld portion and the second weld portion involves forming the first weld portion and the second weld portion by radiating laser light in the direction from a exposed outer side surface of the holding frame of the filter element toward the contact area.

19. The manufacturing method for the filter according to claim 16, wherein the holding frame of the filter element comprises an upper holding frame made of a synthetic resin material having laser absorbency and a lower holding frame made of a synthetic resin material having laser permeability, and the first case member is made of a synthetic resin material having laser permeability, and the second case member is made of a synthetic resin material having laser absorbency, and wherein forming the first weld portion and the second weld portion involves forming the first weld portion and the second weld portion by radiating laser light in the direction from exposed outer side surfaces of the first case member and the lower holding frame of the filter element toward the contact area.

20. The manufacturing method for a filter according to claim 11, wherein the first case member is made of a synthetic resin material having laser permeability, and the second case member and the holding frame of the filter element are made of a synthetic resin material having laser absorbency, and an outer wall that extends in the joining direction and a tip of which contacts the outer side surface of a base of a joining end of the second case member is provided at the outer side of the convex portion of the first case member protruding in the joining direction, and wherein forming the first weld portion and the second weld portion involves forming the first weld portion by radiating laser light toward a contact area extending in the joining direction between the tip of the outer wall and the base of the joining end of the second case member, and forming the second weld portion by radiating laser light toward a contact area extending in the joining direction between the joining end of the second case member and the holding frame of the filter element.

Effect of the Invention

The present invention is described as follows.

According to the filter of the present invention, a weld portion formed by laser light is provided at a contact area extending in a joining direction between a joining end of one of the case members and a holding frame of a filter element. Therefore, the case member and the filter element are solidly integrated by the weld portion. Furthermore, a size of the weld portion can be minimized in a direction orthogonal to the joining direction, and the use of the laser welding suppresses occurrence of welding burrs, thereby minimizing (or even omitting) a burr gutter. As a result, a compact structure can be achieved for the filter overall.

In a case in which one of the one case member and the filter element has a convex portion while the other has a concave portion and when the weld portion is provided at an outer side surface of an engagement portion between the convex and concave portions, the engagement of the convex and concave portions suppresses warpage of the joining portion from occurring during laser welding, thus achieving a sufficient bond strength required. Additionally, the weld portion can be sufficiently disposed away from a filter chamber, and even if the welding burrs occur near the weld portion, intrusion of such burrs into the filter chamber can be suppressed. Consequently, degradation of the product performance of the filter can be prevented.

Further, if a tapered face is provided on an inner side surface of the engagement portion between the convex portion and the concave portion, warpage of the joining portion during laser welding can be prevented more reliably by a mechanical joining force produced by the tapered face. In addition, the tapered face absorbs variances in a dimensional accuracy of the one case member and the holding frame of the filter element, thereby enabling more precise positioning of both members. Moreover, the tapered face allows a longer engagement dimension of the engagement portion between the convex and concave portions on the inner side surface thereof, thus more reliably suppressing the welding burrs that occur near the weld portions from entering the filter chamber.

Furthermore, in a case in which an engaging portion is provided on one of the one case member or the filter element and an engaged portion is provided on the other, warpage of the joining portion during laser welding can be suppressed more reliably by, in addition to the engagement of the convex and concave portions, the engagement of the engaging portion and the engaged portion.

Moreover, in a case in which a first weld portion formed by laser light is provided at a contact area between the first case member and the filter element and a second weld portion formed by laser light is provided at a contact area between the second case member and the filter element, the first case member, the second case member, and the filter element are solidly integrated by the weld portions.

According to a manufacturing method for the filter of the present invention, a weld portion formed by laser light is provided at a contact area extending in the joining direction between the joining end of the one case member and the holding frame of the filter element. Therefore, the one case member and the filter element are solidly integrated by the weld portion. Furthermore, the size of the weld portion in a direction orthogonal to the joining direction can be minimized, and occurrence of welding burrs can be suppressed by the use of laser welding, thus enabling minimization (or even omission) of a burr gutter. Consequently, the size of the overall filter can be minimized.

Figure 1:
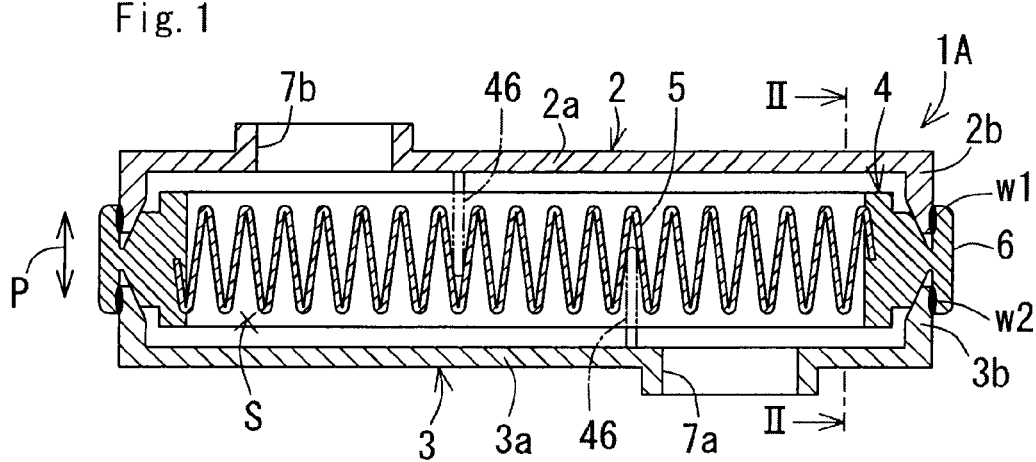
FIG. 1 is a longitudinal sectional view of a filter according to a first embodiment.

DESCRIPTION OF REFERENCE NUMERALS AND SIGNS 1A-1F; filter, 2; upper case member, 2b; joining end, 3; lower case member, 3b; joining end, 4; filter element, 5; filtering medium, 6; holding frame, 8, 9; convex portions, 8a, 9a; tapered faces, 11, 12; concave portions, 11a, 12a; tapered faces, 14; engaged portion, 15; engaging portion, P; joining direction, S; filter chamber, w1; first weld portion, w2; second weld portion.

DETAILED DESCRIPTION OF THE PREFERRED EMBODIMENTS

1. Filter

A filter according to the present invention is provided with a first case member, a second case member, and a filter element.

The "first case member" and the "second case member" are mutually joined together to form a filter chamber, and are not particularly limited in terms of shape, size, material or the like, provided that they are made of synthetic resin. It should be noted that the state of "mutually joined together" includes a state that the case members are mutually joined together with an after-mentioned holding frame.

Conceivable shapes of the aforementioned case members include an open-ended box shape, dish shape, bowl shape, flat shape and the like.

The case members are made from materials such as a synthetic resin material having laser permeability or laser absorbency.

The "filter element" is not particularly limited in terms of shape, size, material or the like, provided that it includes a filtering medium and a synthetic resin-made holding frame that holds the peripheral portion of the filtering medium and is held between respective joining ends of the aforementioned case members.

Conceivable shapes of the filtering medium include a corrugated shape, sheet shape, wave shape and the like. In addition, materials such as non-woven fabric, woven fabric, paper and the like can conceivably be used for the filtering medium.

Examples of materials of the holding frame include a synthetic resin material having laser permeability or laser absorbency.

Examples of the synthetic resin materials composing the holding frame and the respective case members include amorphous resin such as polystyrene (PS), low-density polyethylene (LDPE), and polycarbonate (PC), and crystalline resin such as polypropylene (PP), polybutylene terephthalate (PBT), polyethylene terephthalate (PET), polyamide (PA), and polyacetal (POM).

The filter according to the present invention includes a weld portion formed by laser light at a contact area extending in a joining direction between at least one of joining ends of the first and the second case members and the holding frame of the filter element. It should be noted that "extending in the joining direction" can also entail a state of extending at an angle to the joining direction as well as a state of extending in parallel with the joining direction.

The weld portion can be, for instance, formed by radiating laser light from the side of the filter toward the contact area.

Note that a form of joining one of the case members and the holding frame can be, for example, that one of the joining end of the one case member and the holding frame of the filter element is provided with a convex portion protruding in the joining direction, while the other is provided with a concave portion that engages with the convex portion. In this case, the weld portion can be provided at the outer side surface of the engagement portion between the convex and concave portions.

According to the aforementioned joining form, an inner side surface of the engagement portion between the convex and concave portions can be provided with a tapered face for example.

Furthermore, the convex portion can be engaged with the concave portion with a space secured between a tip face of the convex portion and a bottom face of the concave portion. This configuration enables to more securely absorb variances in a dimensional accuracy of the first case member and the filter element.

In addition to the convex and concave portions as described above, an engaging portion protruding in the joining direction can be provided on one of the joining end of the one case member and the holding frame of the filter element, while an engaged portion that engages with the engaging portion can be provided on the other. The engaging portion and the engaged portion may be formed continuously on the entire periphery of each case member, or formed at predetermined intervals along the entire periphery of each case member.

Conceivable configurations of the filter according to the present invention are described below.

(1) A first weld portion formed by laser light is provided at a contact area extending in the joining direction between the joining end of the first case member and the holding frame of the filter element. A second weld portion formed by laser light is provided at a contact area extending in the joining direction between the joining end of the second case member and the holding frame of the filter element.

(2) A first weld portion formed by laser light is provided at a contact area extending in the joining direction between the joining end of the first case member and the holding frame of the filter element. A second weld portion formed by laser light is provided at a contact area extending in a joining direction between the joining end of the second case member and the joining end of the first case member.

From the standpoint of achieving a more compact filter, the configuration (1) of the two described above is preferred.

In the configuration (1), the aforementioned joining form is applicable, for example, between the first case member and the holding frame as well as between the second case member and the holding frame. Furthermore, in the configuration (2), the aforementioned joining form is applicable, for example, between the first case member and the holding frame.

Furthermore, the first and second weld portions according to the configurations (1) and (2) above can be formed (a) at the same time by single laser light; (b) at the same time by two laser lights; (c) in sequence by single laser light, or the like. The conformation (a) is preferable from the standpoint of forming the weld portions more easily at a lower cost.

In addition, in the configurations (1) and (2) above, the phase of the direction orthogonal to joining direction can be aligned for the first and second weld portions, and a distance from each of the first and second weld portions to the outer side surface of the filter can be set at approximately the same. Consequently, the first and second weld portions can be formed at the same time in substantially the same shape and size by single laser light without changing a focal point of the laser light or the like.

2. Manufacturing Method for the Filter

A manufacturing method for the filter according to the present invention includes the steps of holding the holding frame of the filter element between the joining end of the first case member and the joining end of the second case member, and forming the weld portion by radiating laser light toward a contact area extending in a joining direction between at least one joining end of the joining ends of the first and second case members and the holding frame of the filter element.

In the step of holding the holding frame, the convex portion provided on one of the joining end of the one case member and the holding frame of the filter element can be engaged with the concave portion provided on the other. In the step of forming the weld portion, laser light can be radiated toward the outer side surface of the engagement portion between the convex and concave portions.

Further, in the step of holding the holding frame, in addition to the convex and concave portions, for example, the engaging portion provided on one of the joining end of the one case member and the holding frame of the filter element can be engaged with the engaged portion provided on the other.

Moreover, in the step of forming the weld portion, the first weld portion can be formed by radiating laser light toward the contact area extending in the joining direction between the joining end of the first case member and the holding frame of the filter element. In addition, the second weld portion can be formed by radiating laser light toward the contact area extending in the joining direction between the joining end of the second case member and the holding frame of the filter element Embodiments Hereinafter, a specific description of the present invention will be given based on embodiments with reference to the accompanying drawings. Note that an oil filter for an automatic transmission of a vehicle is used as an example of a filter in the embodiments.

First Embodiment

Figure 2:
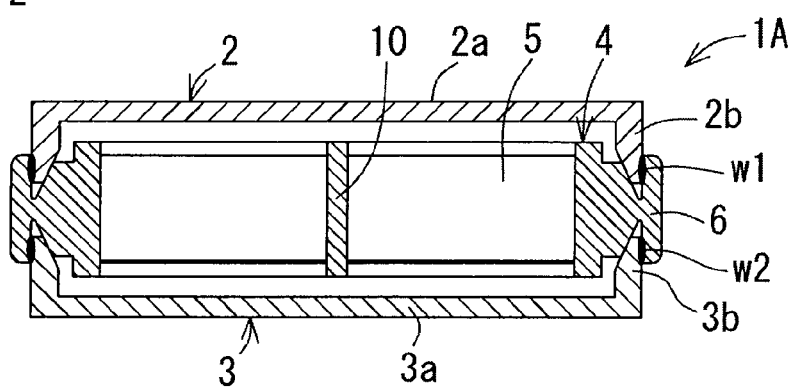
FIG. 2 is a sectional view taken along the line II-II in FIG. 1.

A filter 1A according to a first embodiment includes, as shown in FIGS. 1 and 2, an upper case member 2 (which is an example of a "first case member" according to the present invention) and a lower case member 3 (which is an example of a "second case member" according to the present invention) which are rectangular dish-shaped and joined together to form a filter chamber S. The filter 1 also includes a filter element 4 held between the case members 2 and 3. An inflow port 7a for contaminated oil is formed in the lower case member 3, and an outflow port 7b is formed in the upper case member 2 for filtered oil.

Figure 4:
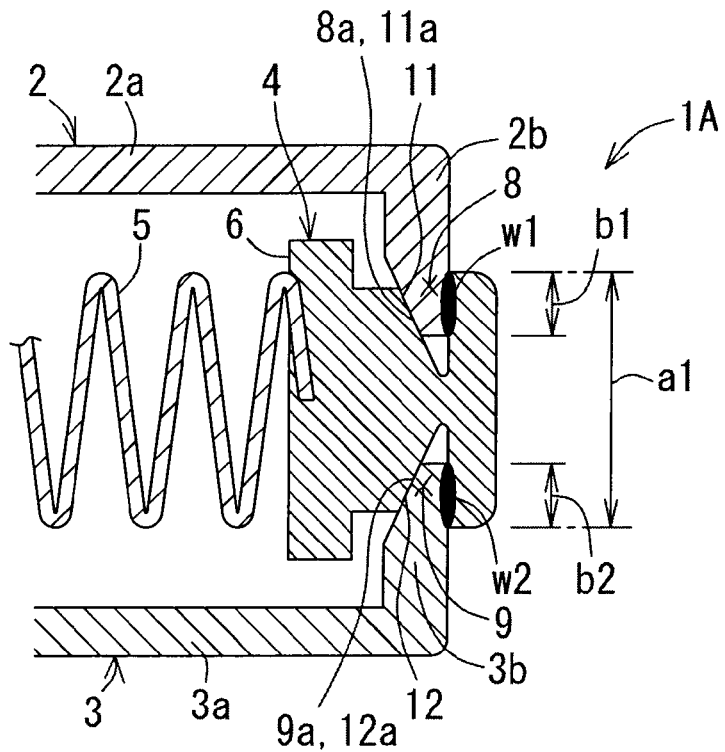
FIG. 4 is an enlarged view of a main portion in FIG. 1.

The upper case member 2 is made of a synthetic resin material having laser absorbency. The lower case member 3 is made of a synthetic resin material having laser absorbency. The case members 2 and 3 are provided with frame-shaped joining ends 2b and 3b that rise from the periphery of the bottom walls 2a and 3a, respectively. As shown in FIG. 4, the tips of the joining ends 2b and 3b are provided with convex portions 8 and 9, respectively, protruding in a joining direction P. Inner peripheral surfaces of the convex portions 8 and 9 are formed with tapered faces 8a and 9a angled in the joining direction P.

Figure 3:
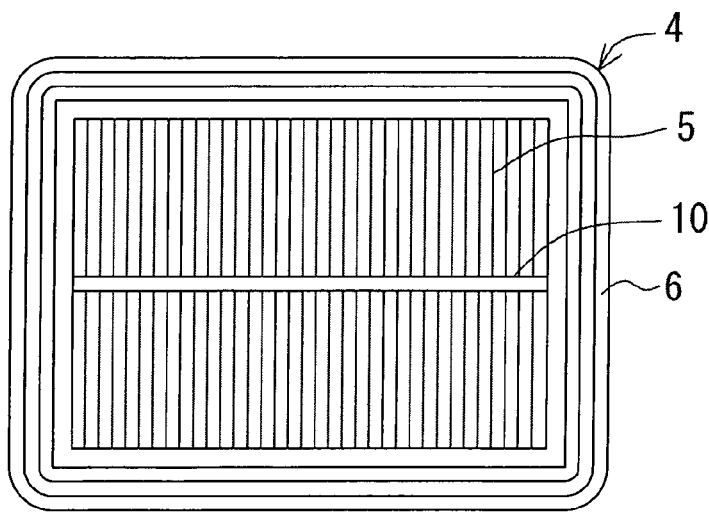
FIG. 3 is a plan view of a filter element.

The filter element 4 is formed by insert-molding for integrating the synthetic resin holding frame 6 having laser permeability with the periphery of a corrugated filtering medium 5 made from a non-woven fabric, as shown in FIGS. 1 to 3. A reinforcing rib 10 that extends in a direction orthogonal to a ridgeline of the corrugation of the filtering medium 5 (i.e. a corrugation direction) and is integrated with a center portion of the ridgeline of the corrugation of the filtering medium 5 is provided between the opposing sides of the holding frame 6.

Additionally, an upper surface and a lower surface of the holding frame 6 are provided with, as shown in FIG. 4, upper and lower concave portions 11 and 12 that engage with the convex portions 8 and 9, respectively. Inner peripheral surfaces of the concave portions 11 and 12 are formed with tapered faces 11a and 12a angled in the joining direction P. Furthermore, the convex portions 8 and 9 and the concave portions 11 and 12 are mutually engaged with each other with a space secured between the tip faces of the convex portions 8 and 9 and the bottom faces of the concave portions 11 and 12.

The outer side surface (which is an example of a "contact area" according to the present invention) of the engagement portion between the convex portion 8 and the concave portion 11 is provided with a first weld portion w1 that joins the upper case member 2 and the holding frame 6 of the filter element 4. Further, the outer side surface (which is an example of the "contact area" according to the present invention) of the engagement portion between the convex portion 9 and the concave portion 12 is provided with a second weld portion w2 that joins the lower case member 3 and the holding frame 6 of the filter element 4. The first and second weld portions w1 and w2 are formed at the same time by laser light radiated from the side of the filter 1A (a direction orthogonal to the joining direction). That is, in laser light absorbing ranges b1 and b2, laser light radiated toward a laser light irradiation range a1 penetrates through the holding frame 6 and reaches the outer side surfaces of the convex portions 8 and 9 of the case members 2 and 3 which are then melted. Heat generated at the melted portions is transmitted to the holding frame 6 which is then melted, forming the first and second weld portions w1 and w2 as a result.

Furthermore, the aforementioned laser light irradiation is performed in a continuous and uniform manner along the outer periphery of the filter 1A while pressure is applied to the case members 2 and 3 in the joining direction P. Accordingly, the first and second weld portions w1 and w2 are formed continuously along the outer periphery of the filter 1A.

Next, operation of the filter 1A mentioned above will be described.

Automatic transmission oil is introduced into a dusty side of the filter chamber S of the filter 1A from the inflow port 7a, and then passes through the filtering medium 5, reaching a clean side of the filter chamber S. As the oil passes through the filtering medium 5, any foreign matters included in the oil can be removed by the filtering medium 5. The oil from which the foreign matters and impurities are removed flows out of the filter 1A from the clean side of the filter chamber S via the outflow port 7b.

As described above, according to the filter 1A in the first embodiment, the first and second weld portions w1 and w2 formed by laser light is provided at the contact area between the respective case members 2 and 3 and the holding frame 6 of the filter element 4. Accordingly, the first and second weld portions w1 and w2 solidly integrates three portions, that is, the case members 2 and 3 and the filter element 4. Also, compared to a weld portion formed by conventional vibration welding, the first and second weld portions w1 and w2 forming by aforementioned laser light welding can be minimized size in the direction orthogonal to the joining direction P. Moreover, use of laser welding makes it possible to suppress occurrence of welding burrs, thereby eliminating a need for a burr gutter. In consequence, a compact structure can be achieved for the filter overall.

Furthermore, according to the filter 1A in the first embodiment, the convex portions 8 and 9 are provided on the case members 2 and 3, respectively, and the concave portions 11 and 12 are provided on the holding frame 6 of the filter element 4. Accordingly, engagement of the convex portion 8 and 9 with the concave portions 11 and 12 suppresses warpage of the joining portion caused by thermal expansion or the like during laser welding, thus achieving a sufficient bond strength required. In addition, since the first and second weld portions w1 and w2 are provided at the outer side surface (opposing the filter chamber) of the respective engagement portions between the convex portions 8 and 9 and the concave portions 11 and 12, the first and second weld portions w1 and w2 can be sufficiently disposed away from the filter chamber S. Therefore, even if the welding burrs occur near the first and second weld portions w1 and w2, the burrs can be prevented from entering the filter chamber S, which in consequence prevents degradation of the product performance of the filter.

Moreover, according to the filter 1A in the first embodiment, tapered faces 8a, 9a, 11a, and 12a are provided on the inner side surfaces of the respective engagement portions between the convex portions 8 and 9 and the concave portions 11 and 12. Accordingly, a mechanical joining force produced by the tapered faces 8a, 9a, 11a, and 12a can more securely suppress warpage of the joining portions caused by thermal expansion or the like during laser welding. Further, the tapered faces 8a, 9a, 11a, and 12a absorb variances in the dimensional accuracy of the case members 2 and 3 and the holding frame 6 of the filter element 4, thereby enabling each member to be positioned more precisely. Moreover, in terms of an engagement dimension of the engagement portions, the configuration in which the tapered faces 8a, 9a, 11a, and 12a are provided on the inner side surfaces of the respective engagement portions between the convex portions 8 and 9 and the concave portions 11 and 12 can make a longer engagement dimension than a configuration in which a faces extending in parallel with the joining direction P are provided on the inner side surfaces of the respective engagement portions between the convex portions 8 and 9 and the concave portions 11 and 12. Consequently, the welding burrs that occur near the weld portions w1 and w2 can be more reliably suppressed from entering the filter chamber S.

Further, according to the filter 1A in the first embodiment, the first and second weld portions w1 and w2 are formed at the same time by single laser light radiated from the side of the filter 1A. As a result, the first and second weld portions w1 and w2 can be formed more easily without changing a focal point of the laser light.

Moreover, according to the filter 1A in the first embodiment, the filter element 4 including the corrugated filtering medium 5 and the holding frame 6 is held between the case members 2 and 3. Consequently, ease of assembling the filtering medium to each case member can be improved compared to a configuration in which the corrugated filtering medium is directly held between the respective case members.

Second Embodiment

Figure 5:
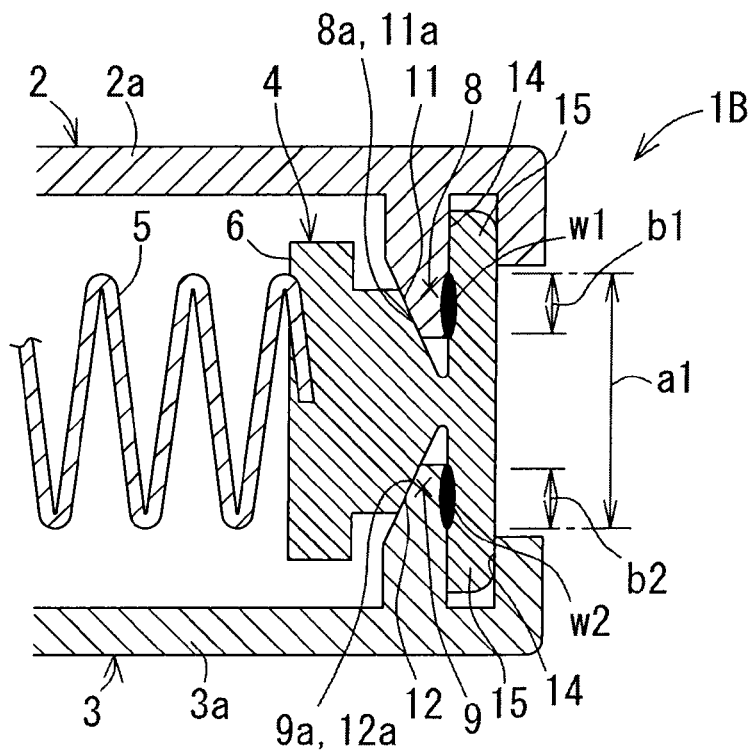
FIG. 5 is a longitudinal sectional view of the filter according to a second embodiment.

A filter 1B according to a second embodiment includes, as shown in FIG. 5, the upper case member 2, the lower case member 3, and the filter element 4 held between the upper and lower case members 2 and 3. Note that, in the second embodiment, the same reference numerals/symbols are assigned for structural parts substantially identical to those in the first embodiment, and accompanying descriptions therefor are omitted while major differences from the first embodiment will be described.

At the outer side of the convex portions 8 and 9 of the case members 2 and 3, an engaged portion 14 that is recessed in the joining direction P is provided. Furthermore, at the outer side of the concave portions 11 and 12 of the holding frame 6 of the filter element 4, an engaging portion 15 that protrudes in the joining direction P and engages with the engaged portion 14 is provided.

Consequently, according to the filter 1B in the second embodiment, the equivalent operation and effects as in the first embodiment can be achieved, and warpage of the joining portion during laser welding can be suppressed more reliably by the engagement between the engaging portion 15 and the engaged portion 14 as well as the engagement between the convex portions 8 and 9 and the concave portions 11 and 12.

Third Embodiment

Figure 6:
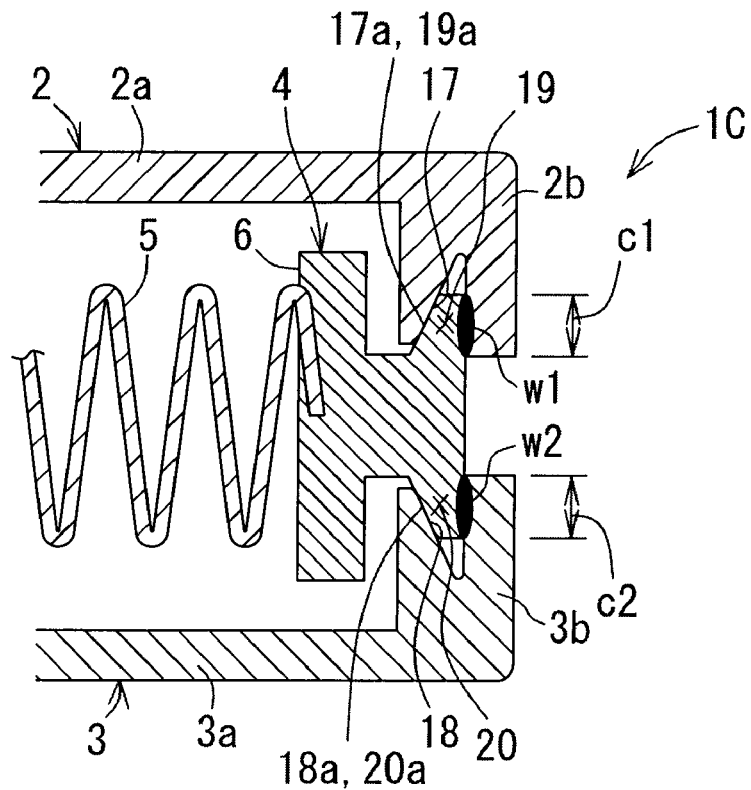
FIG. 6 is a longitudinal sectional view of the filter according to a third embodiment.

A filter 1C according to a third embodiment includes, as shown in FIG. 6, the upper case member 2, the lower case member 3, and the filter element 4 held between the upper and lower case members 2 and 3. Note that, in the third embodiment, the same reference numerals/symbols are assigned for structural parts substantially identical to those in the first embodiment, and accompanying descriptions therefor are omitted while major differences from the first embodiment will be described.

The upper case member 2 is made of a synthetic resin material having laser permeability. The lower case member 3 is made of a synthetic resin material having laser permeability. Respective tips of the joining ends 2b and 3b of the case members 2 and 3 are provided with the concave portions 17 and 18 that are recessed in the joining direction P. The inner peripheral surfaces of the concave portions 17 and 18 are provided with tapered faces 17a and 18a angled in the joining direction P.

The holding frame 6 of the filter element 4 is made of a synthetic resin material having laser absorbency. The upper face and the lower face of the holding frame 6 are provided with the convex portions 19 and 20 that engage with the concave portions 17 and 18, respectively. The inner peripheral surfaces of the respective convex portions 19 and 20 are provided with tapered faces 19a and 20a angled in the joining direction P. Furthermore, the convex portions 19 and 20 and the concave portions 17 and 18 are engaged with each other, with a space secured between the tip faces of the convex portions 19 and 20 and the bottom faces of the concave portions 17 and 18.

The first weld portion w1 that joins the upper case member 2 and the holding frame 6 of the filter element 4 is formed at the outer side surface (which is an example of the "contact area" according to the present invention) of the engagement portion between the convex portion 19 and the concave portion 17. Furthermore, the second weld portion w2 that joins the lower case member 3 and the holding frame 6 of the filter element 4 is formed at the outer side surface (which is an example of the "contact area" according to the present invention) of the engagement portion between the convex portion 20 and the concave portion 18. The first and second weld portions w1 and w2 are formed at the same time (or sequentially) by laser light radiated from the side of the filter 1C (a direction orthogonal to the joining direction). That is, laser light radiated toward respective laser light irradiation ranges c1 and c2 penetrates through the case members 2 and 3 and reaches the outer side surfaces of the convex portions 19 and 20 of the holding frame 6 which are then melted. Heat generated at the melted portions is transmitted to the case members 2 and 3 which are then melted, forming the first and second weld portions w1 and w2 as a result.

Consequently, according to the filter 1C in the third embodiment, an operation and effects substantially identical to those in the first embodiment can be achieved, and warpage of the joining portion during laser welding can be suppressed by the engagement of the concave portions 17 and 18 of the case members 2 and 3 and the convex portions 19 and 20 of the holding frame 6 of the filter element 4, thereby achieving a sufficient bond strength required.

Fourth Embodiment

Figure 7:
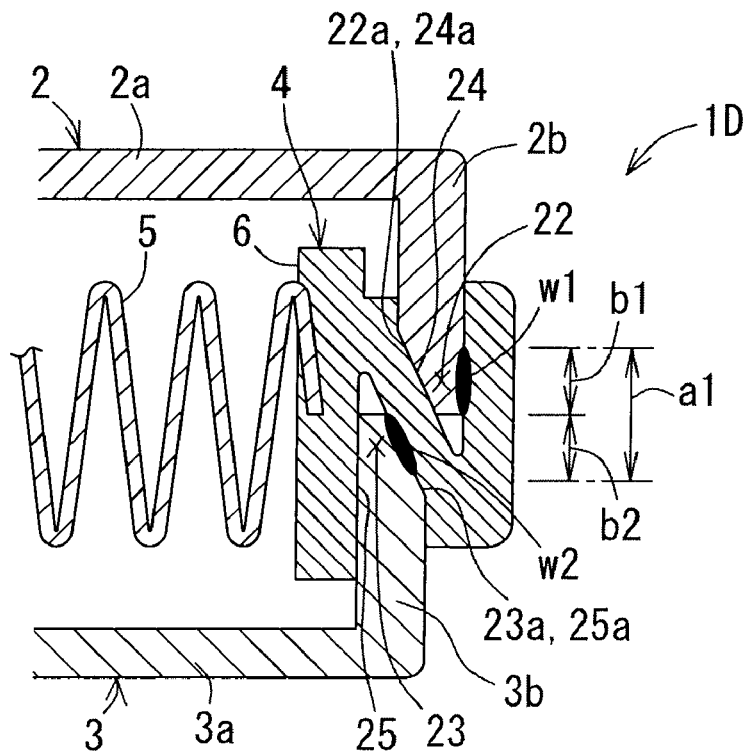
FIG. 7 is a longitudinal sectional view of the filter according to a fourth embodiment.

A filter 1D according to a fourth embodiment includes, as shown in FIG. 7, the upper case member 2, the lower case member 3, and the filter element 4 held between the upper and lower case members 2 and 3. Note that, in the fourth embodiment, the same reference numerals/symbols are assigned for structural parts substantially identical to those in the first embodiment, and accompanying descriptions therefor are omitted while major differences from the first embodiment will be described.

The phase of the direction orthogonal to the joining direction P is slightly offset for the respective joining ends 2b and 3b of the case members 2 and 3. The respective tips of the joining ends 2b and 3b are provided with the convex portions 22 and 23 protruding in the joining direction P. The inner peripheral surface of the convex portion 22 is provided with a tapered face 22a angled in the joining direction P. Further, the outer peripheral surface of the convex portion 23 is provided with a tapered face 23a angled in the joining direction P.

The upper face and the lower face of the holding frame 6 of the filter element 4 are provided with the concave portions 24 and 25 that engage with the convex portions 22 and 23, respectively. The inner peripheral surface of the upper-side concave portion 24 is provided with a tapered face 24a angled in the joining direction P. Further, the outer peripheral surface of the lower-side concave portion 25 is provided with a tapered face 25a angled in the joining direction P.

The first weld portion w1 that joins the upper case member 2 and the holding frame 6 of the filter element 4 is formed at the outer side surface (which is an example of the "contact area" according to the present invention) of the engagement portion between the convex portion 22 and the concave portion 24. Additionally, the second weld portion w2 that joins the lower case member 3 and the holding frame 6 of the filter element 4 is formed at the outer side surface (which is an example of the "contact area" according to the present invention) of the engagement portion between the convex portion 23 and the concave portion 25. The first and second weld portions w1 and w2 are formed at the same time by laser light radiated from the side of the filter 1D (a direction orthogonal to the joining direction).

Consequently, according to the filter 1D in the fourth embodiment, the equivalent operation and effects as in the first embodiment can be obtained. Furthermore, since respective phases of the joining ends 2b and 3b of the case members 2 and 3 are offset in the direction orthogonal to the joining direction P, the first and second weld portions w1 and w2 can be disposed close to the joining direction P. Due to this configuration, laser light with a relatively narrow laser light irradiation range a1, that is, laser light of a small output can be employed.

Fifth Embodiment

Figure 8:
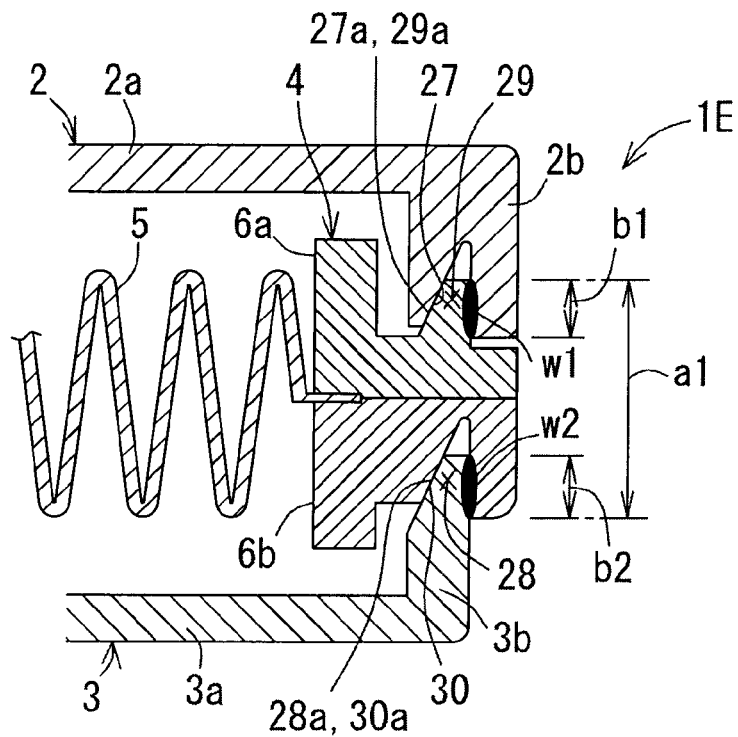
FIG. 8 is a longitudinal sectional view of the filter according to a fifth embodiment.

A filter 1E according to a fifth embodiment includes, as shown in FIG. 8, the upper case member 2, the lower case member 3, and the filter element 4 held between the upper and lower case members 2 and 3. Note that, in the fifth embodiment, the same reference numerals/symbols are assigned for structural parts substantially identical to those in the first embodiment, and accompanying descriptions therefor are omitted while major differences from the first embodiment will be described.

The upper case member 2 is made of a synthetic resin material having laser permeability. Furthermore, the lower case member 3 is made of a synthetic resin material having laser absorbency. In addition, the tip of the joining end 2b of the upper case member 2 is provided with a concave portion 27 recessed in the joining direction P. The tip of the joining end 3b of the lower case member 3 is provided with a convex portion 28 protruded in the joining direction P. The inner peripheral surfaces of the concave portion 27 and the convex portion 28 are formed with tapered faces 27a and 28a angled in the joining direction P.

The aforementioned filter element 4 is formed by holding a peripheral portion of the filtering medium 5 by the upper and lower holding frames 6a and 6b. The holding frame 6a is made of a synthetic resin material having laser absorbency, while the holding frame 6b is made of a synthetic resin material having laser permeability. Furthermore, the holding frames 6a and 6b are mutually fixed by adhesive bonding, welding, screwing, or the like. An upper face of the holding frame 6a is provided with a convex portion 29 that engages with the concave portion 27. Additionally, a lower face of the holding frame 6b is provided with a concave portion 30 that engages with the convex portion 28. Tapered faces 29a and 30a angled in the joining direction P are formed on the inner peripheral surfaces of the convex portion 29 and the concave portion 30.

the first weld portion w1 that joins the upper case member 2 and the holding frame 6a of the filter element 4 is formed at the outer side surface (which is an example of the "contact area" according to the present invention) of the engagement portion between the concave portion 27 and the convex portion 29. Further, the second weld portion w2 that joins the lower case member 3 and the holding frame 6b of the filter element 4 is formed at the outer side surface (which is an example of the "contact area" according to the present invention) of the engagement portion between the convex portion 28 and the concave portion 30. The first and second weld portions w1 and w2 are formed at the same time by laser light radiated from the side of the filter 1E (a direction orthogonal to the joining direction). That is, in a laser light absorbing range b1, laser light radiated toward a laser light irradiation range a1 penetrates through the upper case member 2 and reaches the outer side surface of the convex portion 29 of the holding frame 6a which is then melted. Heat generated at the melted portion is transmitted to the upper case member 2 which is then melted, forming the first weld portion w1 as a result. Furthermore, in a laser light absorbing range b2, laser light radiated toward the laser light irradiation range a1 penetrates through the holding frame 6b and reaches the outer side surface of the convex portion 28 of the lower case member 3 which is then melted. Heat generated at the melted portion is transmitted to the holding frame 6b which is then melted, forming the second weld portion w2 as a result.

Consequently, according to the filter 1E in the fifth embodiment, an operation and effects substantially identical to those in the first embodiment can be achieved. Furthermore, the engagement between the concave portion 27 of the upper case member 2 and the convex portion 29 of the holding frame 6a as well as the engagement between the convex portion 28 of the lower case member 3 and the concave portion 30 of the holding frame 6b suppress warpage of the joining portion during laser welding, thus achieving a sufficient bond strength required.

Sixth Embodiment

Figure 9:
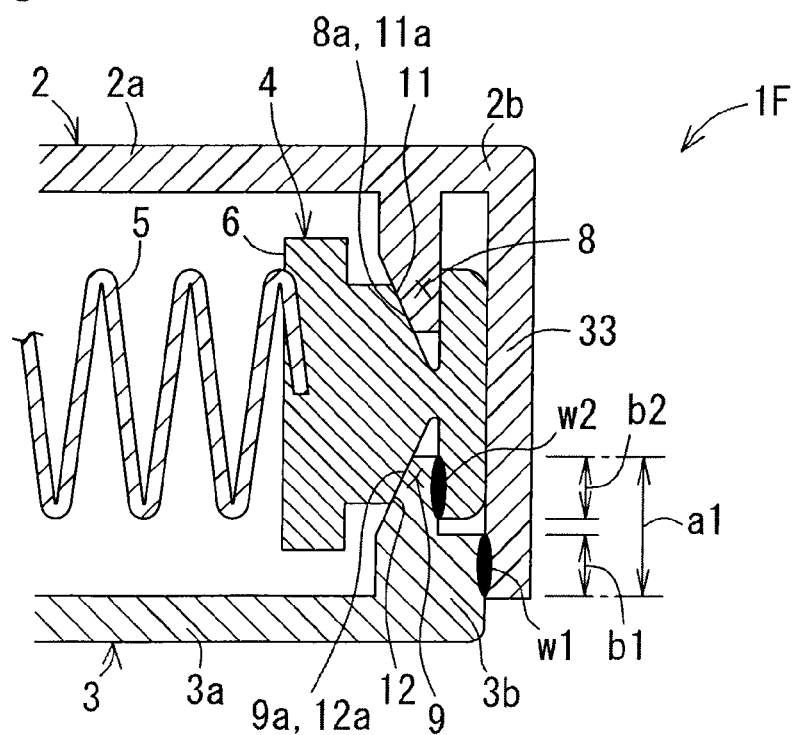
FIG. 9 is a longitudinal sectional view of the filter according to a sixth embodiment.

A filter 1F according to a sixth embodiment includes, as shown in FIG. 9, the upper case member 2, the lower case member 3, and the filter element 4 held between the upper and lower case members 2 and 3. Note that, in the sixth embodiment, the same reference numerals/symbols are assigned for structural parts substantially identical to those in the first embodiment, and accompanying descriptions therefor are omitted while major differences from the first embodiment will be described.

The upper case member 2 is made of a synthetic resin material having laser permeability. Furthermore, the lower case member 3 is made of a synthetic resin material having laser absorbency. At the outer side of the convex portion 8 of the upper case member 2, an outer wall 33 that extends in the joining direction P and a tip of which contacts the outer side surface of the base of the joining end 3b of the lower case member 3 is provided.

The first weld portion w1 which joins the upper case member 2 and the lower case member 3 is formed at a contact area extending in the joining direction P between the tip of the outer wall 33 of the upper case member 2 and the base of the joining end 3b of the lower case member 3. The second weld portion w2 which joins the lower case member 3 and the holding frame 6 of the filter element 4 is provided at the outer side surface (which is an example of the "contact area" according to the present invention) of the engagement portion between the convex portion 9 of the lower case member 3 and the concave portion 12 of the holding frame 6. The first and second weld portions w1 and w2 are formed at the same time by laser light radiated from the side of the filter 1F (a direction orthogonal to the joining direction). That is, in the laser light absorbing range b1, laser light radiated toward the laser light irradiation range a1 penetrates through the outer wall 33 and reaches the outer side surface of the base of the joining end 3b of the lower case member 3 which is then melted. Heat generated at the melted portion is transmitted to the outer wall 33 which is then melted, forming the first weld portion w1 as a result. Furthermore, in the laser light absorbing range b2, laser light radiated toward the laser light irradiation range a1 penetrates through the outer wall 33 and the holding frame 6 and reaches the outer side surface of the convex portion 9 of the lower case member 3 which is then melted. Heat generated at the melted portion is transmitted to the holding frame 6 which is then melted, forming the second weld portion w2 as a result.

Consequently, according to the filter 1F in the sixth embodiment, the equivalent operation and effects as in the first embodiment can be obtained. Since the first weld portion w1 is provided between the upper case member 2 and the lower case member 3, and the second weld portion w2 is provided between the lower case member 3 and the holding frame 6, the first weld portion w1 and the second weld portion w2 can be disposed close to the joining direction P. Accordingly, due to this configuration, laser light with a relatively narrow laser light irradiation range, that is, laser light of a small output can be employed. Moreover, the outer side surface of the holding frame 6 can be covered by the outer wall 33, thereby improving the appearance of the product.

It should be noted that the present invention is not limited to the first to sixth embodiments described above, and various modified embodiments are possible that fall within the scope of the present invention depending on the purpose and application.

Figure 10:
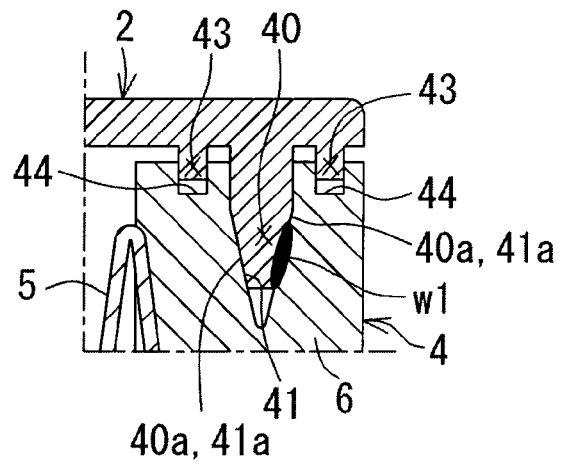
FIG. 10 is a sectional view of a main portion illustrating another form of joining a case member and a holding frame.

More specifically, according to the filters 1A to 1F in the aforementioned first to sixth embodiments, the tapered face is provided only on the inner side surface of the engagement portion between the convex portion, provided on one of the holding frame 6 of the filter element and the case member 2 or 3, and the concave portion provided on the other. However, the present invention is not limited by this, and, as shown in FIG. 10, tapered faces 40a and 41a can be provided on the inner side surface and the outer side surface of an engagement portion between a convex portion 40 and a concave portion 41. Moreover, the tapered faces may be provided only on the outer side surface of the engagement portion.

Furthermore, in the second embodiment, the engaging portion 15 and the engaged portion 14 are provided only at the outer side (a side opposite the filter chamber side) of the weld portions w1 and w2. However, the present invention is not limited by this, and as shown in FIG. 10, for instance, an engaging portion 43 and an engaged portion 44 can be provided on the outer side (a side opposite the filter chamber side) and the inner side (filter chamber side) of the weld portions w1 and w2. Furthermore, the engaging portion and the engaged portion may be provided only at the inner side (filter chamber side) of the weld portions.

Figure 11:
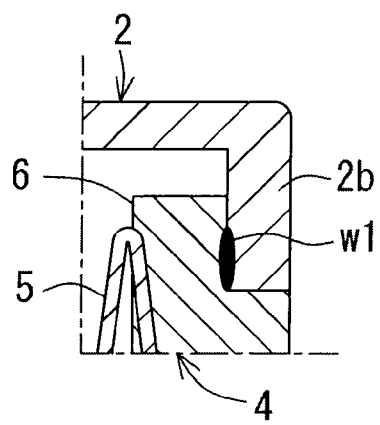
FIG. 11 is a sectional view of a main portion illustrating yet another form of joining the case member and the holding frame.
Figure 12:
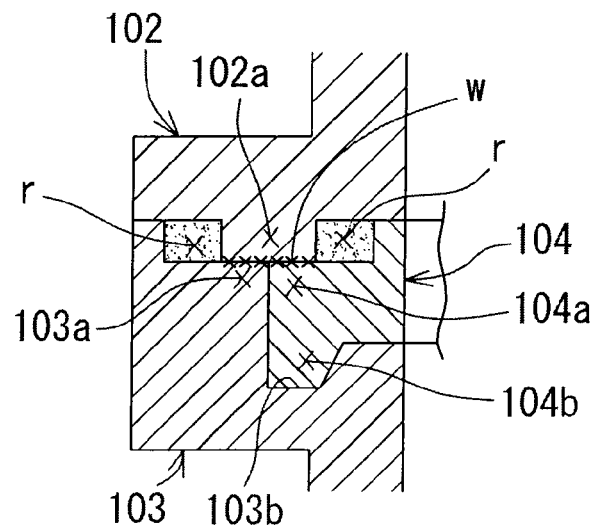
FIG. 12 is a sectional view of a main portion illustrating a form of joining the cases by vibration welding according to a related art.

Furthermore, according to the first to sixth embodiments, the convex portion provided on one of the holding frame 6 of the filter element 4 and the one case member 2 or 3 is engaged with the concave portion provided on the other. However, the present invention is not limited by this, and as shown in FIG. 11, for example, the weld portions w1 and w2 can be formed at a contact area extending in the joining direction P between the respective case members 2 and 3 and the holding frame 6 of the filter element 4 without engaging them.

Additionally, the respective case members 2 and 3 in the first to sixth embodiments can be provided with a supporting piece 46 (shown by an imaginary line in FIG. 1) for preventing collapse of the corrugated portion of the corrugated filtering medium 5.

Moreover, according to the first to sixth embodiments, the filtering medium 5 is disposed in the filter chamber S of the filters 1A to 1F. However, even if the filter chamber S includes therein any other internal parts affected by laser light, the laser permeability can be reduced if a sufficient distance is kept between the holding frame 6 and the filtering medium 5.

Furthermore, the laser light according to the first to sixth embodiments can be a semiconductor, gas, solid, liquid laser light, and the like.

The present invention is used as a filter that filtrates contaminated fluid such as oil, fuel, and air, and more specifically, the filter is more suitably used as an oil filter for an automatic transmission of a vehicle.

The invention claimed is:

1. A filter comprising:
   a first case member and a second case member that are made of a synthetic resin and are mutually joined at a joining end of said first case member and a joining end of said second case member to form a filter chamber; and
   a filter element including a filtering medium and a holding frame made of a synthetic resin which holds a peripheral portion of said filtering medium and is held between the joining end of said first case member and the joining end of said second case member,
   wherein a weld portion formed by laser light is provided at a contact area extending in a joining direction between said holding frame of said filter element and at least one joining end of said joining end of first case member and said joining end of second case member,
   wherein one of said joining end of said one case member and said holding frame of said filter element is provided with a convex portion that protrudes in the joining direction, the convex portion including a tapered face angled in the joining direction, and the other of said joining end of said one case member and said holding frame of said filter element is provided with a concave portion that engages with said convex portion, the concave portion including a tapered face angled in the joining direction,
   wherein the tapered face of the convex portion and the tapered face of the concave portion engage at an inner side surface of an engagement portion between said convex portion and said concave portion with a space defined between a tip face of said convex portion and a bottom face of said concave portion, and
   wherein said weld portion is provided at an outer side surface of said engagement portion between said convex portion and said concave portion opposite said inner side surface of said engagement portion.

2. The filter according to claim 1,
   wherein, on at least one of an inner periphery side and an outer periphery side of said convex portion and said concave portion, one of said joining end of said one case member and said holding frame of said filter element is provided with an engaging portion that protrudes in the joining direction, while the other is provided with an engaged portion that engages with said engaging portion.

3. The filter according to claim 1,
   wherein a first weld portion formed by laser light is provided at a contact area extending in the joining direction between said joining end of said first case member and said holding frame of said filter element, and
   wherein a second weld portion formed by laser light is provided at a contact area extending in the joining direction between said joining end of said second case member and said holding frame of said filter element.

4. The filter according to claim 3,
   wherein said first case member and said second case member are made of a synthetic resin material having laser permeability, and said holding frame of said filter element is made of a synthetic resin material having laser absorbency, and said first weld portion and said second weld portion are formed by laser light radiated in a direction from exposed outer side surfaces of said first case member and said second case member toward said contact area.

5. The filter according to claim 3, wherein said first case member and said second case member are made of a synthetic resin material having laser absorbency, and said holding frame of said filter element is made of a synthetic resin material having laser permeability, and said first weld portion and said second weld portion are formed by laser light radiated in a direction from exposed outer side surfaces of said holding frame of said filter element toward said contact area.

6. The filter according to claim 3, wherein said holding frame of said filter element comprises an upper holding frame made of a synthetic resin material having laser absorbency and a lower holding frame made of a synthetic resin material having laser permeability, and said first case member is made of a synthetic resin material having laser permeability, and said second case member is made of a synthetic resin material having laser absorbency, and said first weld portion and said second weld portion are formed by laser light radiated in a direction from exposed outer side surfaces of said first case member said lower holding frame of said filter element toward said contact area.

7. The filter according to claim 1, wherein said first case member is made of a synthetic resin material having laser permeability, and said second case member and said holding frame of said filter element are made of a synthetic resin material having laser absorbency, and an outer wall that extends in the joining direction and a tip of which contacts said outer side surface of a base of a joining end of said second case member is provided at the outer side of said convex portion of said first case member, and wherein a first weld portion formed by laser light is provided at a contact area extending in the joining direction between said tip of said outer wall of said first case member and said base of said joining end of said second case member, and wherein a second weld portion formed by laser light is provided at a contact area extending in the joining direction between said joining end of said second case member and said holding frame of said filter element.

8. The filter according to claim 1, wherein the tapered face of the convex portion is angled in the joining direction at an acute angle.

9. The filter according to claim 1, wherein said joining end of said case member is provided with the convex portion and a width of the convex portion in a direction perpendicular to the joining direction decreases along the joining direction from a first end of the joining end connected to a bottom wall of the case member to a second end of the joining end connected to the holding frame.

10. The filter according to claim 1, wherein an angle in which the tapered face of the convex portion is angled in the joining direction is the same as an angle in which the tapered face of the concave portion is angled in the joining direction.

11. The filter according to claim 1, wherein the convex portion includes a face extending along the joining direction and has a V-like cross-sectional shape formed by the tapered face and the face extending along the joining direction, and the concave portion has a V-like cross-sectional shape which engages with the convex portion.

12. The filter according to claim 1, wherein the convex portion and the concave portion of the first case member side and the convex portion and the concave portion of the second case member side are provided symmetrically on either side of a plane perpendicular to the joining direction.

* * * * *